United States Patent Office 2,888,397
Patented May 26, 1959

2,888,397

HYDROCARBON CONVERSION PROCESS

William P. Burton, Little Silver, Philip A. Lefrancois, Cranford, and Earl W. Riblett, Tenafly, N.J., assignors to The M. W. Kellogg Company, Jersey City, N.J., a corporation of New Jersey No Drawing. Application June 2, 1953
Serial No. 359,208

15 Claims. (Cl. 208—138)

This application is a continuation-in-part of application Serial No. 242,031, filed August 15, 1951, now U.S. Patent No. 2,662,861, and is a continuation-in-part of application Serial No. 353,236, filed May 5, 1953, now U.S. Patent No. 2,818,393.

This invention relates to novel processes in which platinum and/or palladium catalysts are employed, and more particularly, it pertains to hydrocarbon conversion processes in which platinum and/or palladium catalysts are used.

Platinum catalysts are used extensively to reform light hydrocarbon oils such as, for example, naphtha fractions, to produce gasoline of high anti-knock value. In a reforming operation, it is extremely important to produce as little carbon and normally gaseous product material as is possible, because such materials represent essentially an economic loss to be charged against the process. The property of the catalyst which is instrumental in effecting high yields of normally liquid product is referred to as selectivity, and this property is measured as the quantity of normally liquid product, substantially free of hydrocarbons containing four or less carbon atoms, which is produced at a given octane level. Large improvements in selectivity are not very probable, since it appears that there is a limit to the quantity of normally liquid product material which can be produced, in view that it is unavoidable to obtain some carbon and normally gaseous product material at the elevated temperatures being used in this operation. Consequently, any increase in selectivity to the extent of at least one-half of a percent is considered significant by reason of the difficulty in obtaining such an improvement as well as the economic advantage which results therefrom. It is proposed by means of the present invention to provide a platinum catalyst which has a significantly better selectivity than those catalysts previously known.

It is an object of this invention to provide a novel process in which a platinum and/or palladium catalyst is employed.

Another object of this invention is to provide an improved hydrocarbon conversion process in which a platinum and/or palladium catalyst is utilized.

Still another object of this invention is to provide an improved hydroforming process in which a platinum and/or palladium catalyst of high selectivity for the production of gasoline of high anti-knock value is utilized.

Other objects and advantages of this invention will become apparent from the following explanation and description thereof.

In accordance with the present invention, the novel chemical process utilizes a platinum and/or palladium catalyst which is obtained by the method which comprises combining an ammine complex of platinum and/or palladium, a carrier material in the precursor or final state and an activating agent comprising a substance containing mercury, zinc or cadmium and then subjecting the mixture to a treatment whereby the ammine complex is converted to metallic platnium and/or palladium. The catalytic element, platinum and/or palladium, is preferably supported on an alumina containing material and for the purposes of this specification and the appended claims, it is intended by the term "alumina containing material" to include a hydrous or hydrated alumina or a dried and/or calcined alumina.

The carrier material which is employed in the preparation of the platinum and/or palladium catalysts of this invention can include a large variety of materials. For example, the carrier material can be silica, alumina, titania, charcoal, thoria, zirconia, pumice, kieselguhr, fuller's earth, "Superfiltrol," magnesia, silica-alumina with titania or thoria, silica-magnesia, etc. Furthermore, the catalyst can also contain combined halogen such as, for example, fluorine, chlorine, etc. The halogen content of the catalyst can be from about 0.01 to about 10% by weight, more usually, about 0.2 to about 10% by weight, preferably, about 0.2 to about 8% by weight, based on the total catalyst. It was found that an excellent carrier material comprises alumina having incorporated therein a small amount of silica, namely, in the amount of 0.1 to about 12% by weight, more usually about 1 to about 10% by weight, based on the total catalyst. Silica in such small proportions enhances the stability of the catalyst at elevated temperatures, and also, it serves to inhibit non-selective cracking reactions which result in the production of coke and normally gaseous hydrocarbons, when the catalyst is employed in a hydrocarbon conversion process. As previously indicated, the carrier material can be used in the hydrous and/or hydrated form or it can be a material which has been previously dried and/or calcined. In any case, the carrier material is combined with the platinum and/or palladium ammine complexes, and then further treated in accordance with the procedure which will be more fully described hereinbelow. In the finished catalyst, the platinum or palladium can constitute about 0.01 to about 5%, more usually, about 0.1 to about 2.5, based on the total weight of the catalyst. The catalyst may contain larger quantities of platinum or palladium such as, for example, up to about 15% by weight, however, usually, this may not be desirable for economical considerations.

Alumina is an excellent support material for the catalyst of the present invention. Alumina can be prepared by a variety of methods and all of these are satisfactory for the purposes of this invention. In the preparation of alumina, aluminum; water; an acid such as, for example, formic acid, acetic acid or hydrochloric acid; and mercury or mercuric oxide are reacted under suitable conditions and proportions to produce a hydrous alumina or alumina sol. The alumina sol is then treated with an alkaline reagent, e.g., ammonium hydroxide, in order to effect a gelation. In the treatment of the alumina sol with an alkaline reagent, it is desirable to adjust the pH to a value between about 5 to about 12. The alumina can also be prepared by reacting aluminum, water and mercury or mercuric oxide at an elevated temperature, preferably at the boiling point of the solution. The alumina thus produced then can be optionally treated with an alkaline reagent, e.g., ammonium hydroxide. Another method of preparing alumina is to precipitate alumina gel from an aluminum salt, e.g., aluminum chloride, aluminum sulfate, aluminum nitrate, etc., by means of an alkaline reagent, e.g., ammonium hydroxide. The precipitation is conducted at a pH of between about 3.5 to 7. The gel thus produced can then be further treated with an alkaline reagent, e.g., ammonium hydroxide, with or without aging for a suitable period of time. In all of the preparations of alumina given above, it is also intended that the alumina may be aged, with or without treatment by means of an alkaline reagent, for a period of at least about 10 hours, more usually, at least about 17 hours. The alumina prepared by the methods described above will be, upon calcination, either gamma- or eta-alumina or mixtures of the two.

As previously indicated, a platinum or palladium ammine complex is used as the means of supplying the catalytic agent. The platinum or palladium ammine complex is prepared from ammonia or substituted ammonia compounds, e.g., the ammines and a platinum or palladium compound. The methods of preparing the ammine complexes are readily known to those skilled in the art to involve complexing a platinum or palladium compound, such as a salt, e.g., a halide, nitrate, sulfate, sulfite, nitrite, oxyhalide, etc., with ammonia or substituted ammonia, e.g., alkylamine, alkyldiamine, quinoline, pyridine, hydrazo compounds, hydroxylamine, etc. The platinum or palladium in the complex may have a coordination valence of 4 or 6. The ammine complexes may be soluble in a polar or non-polar solvent which is employed for facilitating the catalyst preparation, or such ammines can be colloidally dispersed in either a polar or non-polar solvent in the required quantities. In either case, the solution or suspension of ammine complex should be employed in quantities which will provide adequate distribution of the complex throughout the entire catalyst mixture in the desired manner. However, it is preferred to employ the water soluble ammine complexes, e.g., the platinous ammine complexes, by reason that these compounds result in very effective types of catalysts. The platinuous ammine halides are further exemplary of this preferred group. Specific examples of complexes which may be suitable for this invention include nitritodihydroxylaminoammineplatinous chloride, nitritoethylenediaminoammineplatinous chloride, nitritopyridinodiammineplatinous chloride, tetrahydrazinoplatinous chloride, dihydrazinodiammineplatinous chloride, tripropylenediaminoplatinic chloride, nitritodichloroethylenediaminoethylammineplatinic chloride, dichloroquatermethylaminoplatinic chloride, dichlorobisethylenediaminoplatinic chloride, chlornitritopyridinotriammineplatinic chloride, tetrahydroxylaminoplatinous chloride, hydroxylaminotriammincplatinous chloride, quatermethylaminoplatinous chloride, bismethylaminodiamineplatinous nitrate, dihydrazinodiammineplatinous chloride, quaterpyridinoplatinous sulfate, bispyridinopalladic chloride, bisethylenediaminopalladous chloride, etc. The relative quantities of the platinum or palladium ammine complex and of the carrier material are determined by the final composition of the catalyst which is desired.

The ammine complex can be combined with the carrier material in any manner which is described hereinafter. The ammine complex can be mixed with the carrier material in the gel or sol form and this mixture is dried and calcined. Alternatively, the ammine complex is first mixed with the carrier material in either the dried and/or calcined state, and the entire mixture is then dried and calcined.

The decomposition of the ammine complex of platinum and/or palladium is effected in the presence of a metal, such as mercury, zinc or cadmium or a compound thereof. The activating agent serves to produce a catalyst of substantially greater activity than catalysts which are prepared without the presence of the activating agent, and also, quite unexpectedly to produce a catalyst of excellent selectivity. The activating agent may remain in the final catalyst in certain instances, however, preferably it is a volatile material which evaporates or decomposes, either at or below the temperature at which the catalyst is calcined, or at the operating temperature at which the catalyst is maintained under conversion or regeneration conditions.

The activating agent can be used in the form of an organic or inorganic compound of mercury, zinc or cadmium, or mixtures of the foregoing compounds. The inorganic compounds of mercury, zinc or cadmium include the oxides, hydroxides and salts thereof. The inorganic salts of mercury, zinc and cadmium include, for example, the chlorides, chlorates, bromides, nitrates, sulfates, nitrites, sulfides, sulfites, carbonates, bicarbonates, oxychlorides, fluorides, iodides, phosphates, phosphites, etc. Specific examples of inorganic compounds of mercury, zinc and cadmium are mercuric bromide, mercuric chloride, mercuric chlorate, mercuric cyanide, mercuric nitrate, zinc bromide, zinc chlorate, zinc hydroxide, zinc nitrate, zinc sulfide, cadmium carbonate, cadmium hydroxide, cadmium cyamide, cadmium iodide, etc.

The organic compounds of mercury, zinc and cadmium which are useful as activating agents include a variety of classes such as, for example, the salts of the aliphatic and aromatic carboxylic acids, the aliphatic and aromatic sulfur salts, as well as the aliphatic and aromatic phosphorus acids, etc. Particularly useful compounds of mercury, zinc and cadmium are the aliphatic carboxylic salts such as those derived from the fatty acids, the carbonic cids, the thiocarbonic acids, etc. Specific examples of activator salts of the aliphatic carboxylic acids are the monobasic types such as, for example, mercurous acetate, mercuric propionate, mercuric butyrate, mercuric valerate, zinc acetate, zinc formate, zinc caproate, cadmium acetate, cadmium propionate, mercury ethyl carbamate, mercury propyl carbamate, zinc butyl carbamate, cadmium pentyl carbamate, mercury ethyl xanthate, zinc propyl xanthate, cadmium butyl xanthate, etc. The aliphatic polycarboxylic acids can also be used. Useful mercury, zinc and cadmium salts of aromatic carboxylic acids can be of the mono- or polybasic type. Examples of such salts are mercuric phthalate, zinc phthalate, cadmium phthalate, mercurous salicylate, zinc salicylate, cadmium salicylate, etc.

It is preferred that the activating agent volatilizes from the catalyst mass at or before calcination temperatures. In some instances, the activating agent is not volatilized at such temperatures, consequently, the calcination operation may be conducted under subatmospheric pressures in order to remove substantially all or completely the activating agent from the catalyst mass. Moreover, it is preferred to employ activating agents which volatilize from the catalyst mass at a temperature not greater than about 1200° F. However, it should be understood that the activating agent in a suitable form can be present in the finished catalyst.

Ordinarily, in the preparation of the catalyst, the activating agent can be added to the carrier material prior to the addition of the platinum and/or palladium ammine complexes; or the activating agent can be added to the mixture of carrier material and platinum and/or palladium ammine complexes; or the addition of the activating agent can be made to the platinum and/or palladium ammine complexes prior to mixing the carrier therewith. The quantity of activating agent employed is about 0.01 to about 10.0%, preferably about 0.05 to about 5.0%, based on the weight of the carrier. For example, a mercury compound should be mixed with a carrier such as, for example, alumina gel in such proportions so as to produce a mercury to alumina dry weight ratio of about 0.0001 to 0.1 or higher. In this type of a preparation, the action of the activating agent is not completely understood, although it produces an effect on the catalyst which greatly enhances its activity and selectivity over any catalyst prepared in the same manner with the activating agent omitted. Whatever may be the change in the catalyst resulting from the introduction of the activating agent into the mixture of constituents from which he catalyst is manufactured, it is not necessary that the activating agent remain in the final catalyst product. As a practical matter, it is preferred to employ activating agents which volatilize below about 1000° F. or 1050° F., and which will leave no apparent trace of residue in the finished catalyst.

In the preparation of the catalyst, the activating agent can be used alone or optionally with a promoting agent which will be described more fully hereinafter. The activating and promoting agents can be incorporated into the catalyst mass by the following methods: (1) with the carrier material either before or after drying and/or calcination; (2) with the activating agent described above; (3) with platinum and/or palladium ammine complexes; or (4) the promoting agent can be added to a mixture of any two or more of the materials discussed above.

The function of the promoting agent is not clearly understood, however, the resultant activity of the catalyst material prepared by employing the promoting agent includes a variety of classes of compounds, such as for example, primary, secondary and tertiary aliphatic monohydric alcohols, aliphatic dihydric alcohols, aliphatic trihydric alcohols, ketones of the aliphatic and aromatic type, aromatic alcohols; etc. The alcohols can be those in which there are present groups such as, for example, amino, sulfhydryl, nitro, nitroso, halogen, alkoxyalkyl, carboalkoxy, etc. Among the aliphatic alcohols, it is preferred to employ the alkanols containing about 1 to 9 carbon atoms in the molecule. With respect to aliphatic polyhydric alcohols, it is preferred to employ those containing not more than 10 carbon atoms in the molecule. The ketones may comprise the aliphatic or the aromatic type, however, it is preferred using the aliphatic ketones, particularly the alkanones containing not more than 4 carbon atoms in the molecule. It is to be noted that in the case of the promoting agents, it is desired that they possess a water solubility of at least about .05% by weight at 70° F.

For the purposes of this specification and the appended claims, it is intended that "water solubility" of the promoting agent will be the minimum solubility just mentioned. Water solubility is important from the standpoint of obtaining uniform distribution of the promoting agent throughout the catalyst mass prior to drying and calcination. The components of the catalyst prior to drying and calcination may be in the form of a slurry or gel which contain sufficient amounts of water to provide for adequate distribution of the promoting agent. It is possible to employ a material having a lower solubility than indicated hereinabove, however, it will be found that less satisfactory results are produced with respect to catalyst activity. It is preferred that the promoting agent is volatilized from the catalyst mass at a temperature of about or below the calcination point. This is desired in order to avoid the deposition of undesirable cracked products on the finished catalyst product. The following are specific examples of promoting agents which are useful for the purposes of the present invention; methanol, ethanol, propanol, butanol, pentanol, hexanol, heptanol, ethylene glycol, propylene glycol, glycerol, acetone, methyl ethyl ketone, methyl propyl ketone, phenols, benzyl alcohol, etc.

The amount of promoting agent employed is determined on the basis of the water which is present in the catalyst mass prior to subjecting the same to a drying and/or calcination operation. It is desirable, ordinarily, to use about 1 to about 50% by weight, preferably about 10 to about 40% of the promoting agent, based on the weight of the water which is present in the catalyst mass, prior to subjecting the mass to a drying and/or calcination operation. It is preferred that the promoting agent be volatilized substantially or completely from the catalyst mass at or about the calcination temperature. However, it is included within the scope of this invention to have a small residue from the promoting agent in the final catalyst product.

After mixing the components of the catalyst mass, including the promoting agent of this invention, the mixture can be subjected to a drying operation. During the drying step, when using a low boiling point promoting agent, it is found that a substantial part or all of the promoting agent is vaporized or volatilized from the catalyst mass. Beneficial effects in catalyst activity are obtained even though the promoting agent is substantially all or completely removed from the catalyst mass at a relatively low temperature such as the drying operation. In other cases, where the promoting agent is less volatile, it remains in the catalyst mass for a longer period of time, and usually, until the calcination temperature is reached. It is not essential that the promoting agent be removed completely from the catalyst mass at the time of reaching calcination temperatures. It is also contemplated that part of the promoting agent be removed during the calcination operation, although it is preferred that substantially all of this agent is removed from the catalyst mass at the time of reaching the calcination temperature. This is desirable in order to avoid any undesirable effects from cracking the promoting agent at elevated temperatures.

After the activating agent, the platinum and/or palladium ammine complexes, the carrier material, and with or without the promoting agent, have been thoroughly mixed, the mixture is dried and/or calcined. The drying operation can be conducted at a temperature of not more than about 400° F., preferably about 200° to about 250° F. for a period of about 15 to 50 hours. Alternatively, drying can be accomplished by a flash technique which involves introducing a slurry of catalyst mass into an oven which is maintained at an elevated temperature, for example, at least about 600°–700° F. After drying the catalyst mass, it is treated at a temperature of at least about 400° F., more usually, at a temperature in the range of about 600° to about 1500° F., preferably about 700° to about 120° F., and for a period of generally about 2 to 20 hours, more usually about 2 to about 8 hours. However, it is also contemplated reducing the complex by passing hydrogen over the dry material at moderately elevated temperatures. Further, the metal may be deposited on the carrier material before drying by the addition of a reducing agent such as, for example, hydrazine or citric acid, to the ammine complex.

Catalysts prepared according to the present invention possess numerous outstanding advantages and have a wide field of utility. In general, it appears that these contact materials are suitable for any chemical reactions which are susceptible to catalysis with platinum or palladium. They are useful in a variety of hydrocarbon conversion reactions, particularly those in which the hydrogen-carbon ratio is altered. Among the numerous reactions which lend themselves to catalysis by contact materials of the type disclosed herein are dehydrogenation, hydrogenation, hydrogenolysis, cracking, hydrocracking (i.e., cracking under hydrogen perssure), isomerization, oxidation, aromatization, cyclization, hydrodesulfurization, hydrocarbon synthesis, dealkylation, hydrodechlorination, dehydroxylation, alkylation, polymerization and hydrogen exchange systems. In general, these reactions may be carried out under the conventional reaction conditions of temperature, pressure, etc., with the catalyst described herein, however, in many instances, the activity of the new contact materials permits the employment of less severe conditions, especially lower temperatures and contact times, without any sacrifice in yield. A wide variety of organic compounds may be dehydrogenated including naphthenes, paraffins, alkyl radicals in aralkyl compounds, butenes, sterols, glycerides, and many other organic compounds. By changing the reaction conditions in known manner, these catalysts are also effective for hydrogenating compounds in general, especially fatty glycerides and olefins. They may also be employed in the hydrogenolysis of nitrobenzene to aniline and similar chemical changes. Another utilization lies in the dehydroxylation or demethylization or both of cresylic acid-type compounds. Among the substances which can be isomerized with these catalysts, paraffins and naphthenes are the most significant feeds from a commercial standpoint; but polyalkyl aromatics may be similarly treated, as exemplified in the catalytic transformation of o-xylene to p-xylene. In addition to the more common cracking reactions, the contact materials of the present invention are especially suitable for cracking in the presence of hydrogen as in the hydroforming process in which the feed is customarily a low octane naphtha. In hydroforming with the novel catalysts, a substantial degree of sulfur removal occurs, and the reaction may readily be shifted to favor hydrodesulfurization rather than reforming by changing the reaction conditions in a manner familiar to those skilled in the art. The synthesis of hydrocarbons from carbon monoxide and hydrogen in the presence of the new contact materials is also contemplated. In the field of oxidative reactions, numerous changes can be effected with the present catalysts including, for example, the transformation of sulfur dioxide to sulfur trioxide, the formation of nitric acid and also of hydrazine from ammonia, the conversion of urea into hydrazine and the oxidation of hydrocarbons in general. An example of a catalytic hydrodechlorination reaction of current importance, which may be catalyzed by the newly discovered agents, is that in which hydrogen converts trifluorotrichloroethane into trifluorochloroethylene and hydrogen chloride. The contact materials of the present invention are also suitable for the hydrogen exchange systems as exemplified by the hydrogenation of coal with decalin and tetralin. By reason of their aromatizing and cyclizing characteristics, they are outstanding in preparing benzene, toluene, and the like in substantial yields from paraffins and naphthenes and also for the production of more highly cyclized compounds such as naphthalene, anthracene and alkyl substituted derivatives thereof under suitable conditions. In addition, polymerization and alkylation reactions are responsive to these catalysts, for example, the polymerization of olefins and the alkylation of aromatic compounds.

In a hydrocarbon conversion process, the hydrocarbon reactant is contacted with the catalyst at a temperature of 400° to 1250° F., more usually, 800° to 1100° F., at a pressure of about atmospheric to 2500 p.s.i.g., and a weight space velocity of about 0.01 to about 15, more usually, about 0.1 to about 10.

The catalysts prepared in accordance with the present invention are particularly adapted for the reforming of light hydrocarbon oils, e.g., naphtha stocks. In reforming naphtha or gasoline stocks with the catalyst disclosed herein, the conditions may be varied rather widely; thus temperatures of about 750° to about 1050° F. are suitable and the preferred range is from about 850° to about 975° F. Within these temperature limits, weight space velocities of about 0.05 to about 10.0 pounds of naphtha per hour per pound of catalyst in the reaction zone may be employed advantageously; however, space velocities at about 0.25 to about 5.0 provide better results. Hydrogen should be introduced into the reforming reactor at rates running from about 0.5 to about 20.0 mols of hydrogen per mol of hydrocarbon reactants. This hydrogen may be in admixture with light gaseous hydrocarbons. In fact, it is usually introduced by recycling the normally gaseous products, chiefly hydrogen along with up to about 45% of 1 to 3 carbon atom containing hydrocarbons, of the reforming reaction. The hydrogen serves an important function in maintaining the activity of the contact material by minimizing coke deposition thereon. While the total reaction pressure may be maintained at any value between about 25 to 1000 pounds per square inch gauge (p.s.i.g.), the best results are obtained by holding the reaction pressure within the range between about 100 and 750 p.s.i.g. In any event, the hydrogen pressure should not be allowed to become so great under any given set of reaction conditions that destructive hydrogenation is inaugurated, as this will result in a consumption rather than a net production of hydrogen in the reaction. However, the present invention, in its broadest aspect, is applicable to a process involving a net consumption of hydrogen as well as a net production of hydrogen. Either case is obtained by selecting proper reaction conditions within the ranges specified hereinabove.

The feed stock employed in the reforming operation is a light hydrocarbon oil, e.g., gasoline, naphtha and kerosene. For the most part, the naphtha fraction of a petroleum crude, whether cracked thermally or catalytically, or a straight run stock, or mixtures of the foregoing is used as the feedstock to reforming operations. The naphtha fraction may have an initial boiling point of about 80° F. to about 275° F. and an end point of about 295° to about 525° F. The olefin content may vary from about 0 to 3 mol percent, and the octane number may vary from about 20 to about 75CFRR clear. Patinum and/or palladium catalysts withstand the deteriorating effect of sulfur, however, high concentrations of sulfur may have an adverse effect on product distribution, consequently, it is preferred to employ stocks having not more than about 0.07 or 0.10% sulfur. Higher sulfur concentrations in the feed stock may produce less satisfactory results, although stocks having a sulfur concentration of about 0.01 to about 2.5% by weight can be used for the purposes of this invention.

As a result of the reforming operation, the catalyst can contain about 0.05 to about 5% carbon, which deactivates the catalyst. In order to restore catalyst properties, it can be treated under mild conditions with an oxygen containing gas having an oxygen partial pressure of 0.1 to 4 p.s.i.a., and a temperature of about 600° F. to about 1250° F., preferably about 850° to about 1000° F. to remove amorphous carbon, and then subjected to a more drastic treatment with an oxygen containing gas having an oxygen partial pressure of 4 to 200 p.s.i.a., more usually, 6 to 150 p.s.i.a., and preferably about 14.7 to about 100 p.s.i.a. and at a temperature of about 600° to 1600° F., more usually, about 900° to 1250° F. The mild or drastic treatment can be used alone or both can be used in sequence. When processing high sulfur containing stocks, at least 0.2% sulfur, the regeneration treatment may be followed or preceded with a hydrogen containing gas treatment at elevated temperatures, e.g., 500° to 1400° F. to restore catalytic properties.

In order to more fully understand the present invention, reference will be had to a specific example thereof.

Several catalysts were prepared including one which comes within the scope of the present invention, in order to demonstrate the unusually high activity and selectivity which is possessed by the same for the hydroforming process.

CATALYST I 5210 grams of $AlCl_3 \cdot 6H_2O$ were dissolved in 16 liters of water to which were added 4 liters of concentrated ammonium hydroxide with continuous stirring of the mixture. The alumina gel was produced and after stirring for an additional 2½ hours, 1 liter of water was added to produce a gel having a pH of 6.50 at 30° C. 150 cc. of concentrated ammonium hydroxide and 1 liter of water were added to the alumina gel to give the resultant pH of 7.34 at 27° C. The gel was first filtered and then washed 10 times, 8 of which involved the use of an ammoniacal solution in water and the other 2 times the gel was washed with water alone. A portion of the alumina gel containing 528 grams of alumina was slurried in 2 liters of water and then peptized with 58 cc. of acetic acid solution made up of 1 part by volume of acetic acid and 1 part by volume of water. The peptized alumina was stirred for 1 hour and it had a pH of 4.57 at 22° C.

4.1 grams of $PtCl_2$ were dissolved in 450 cc. of concentrated ammonium hydroxide. The solution was made up by adding the ammonia in aliquot portions and simultaneous warming. The excess ammonia was removed by heating and the pH of the platinous tetrammine chloride solution adjusted to 7 by the addition of acetic acid. The pH of the solution was adjusted to 7 by the addition of glacial acetic acid and then the solution contained platinous tetrammine chloride.

The platinous tetrammine chloride solution was added dropwise from a separatory funnel to the alumina gel and required 20 minutes. The activated alumina was then stirred for an additional 1 hour period. The resultant slurry was dried for 65 hours at 230° F. in an Elconap oven. The dried mass was calcined for 2 hours at 1000° F. The calcined catalyst was ground to a powder and then pelleted into 3/16 inch pills using 2% aluminum stearate as a lubricant. The pelleted catalyst was calcined for an additional 4 hours at 1000° F. The catalyst contained approximately 0.46% platinum and 0.01% chloride ions on alumina.

CATALYST II 5682 grams of $AlCl_3 \cdot 6H_2O$ were dissolved in 18 liters of water and then stirred thoroughly. 4400 cc. of concentrated ammonium hydroxide was added to the aluminum chloride solution. An additional 2 liters of water were added to the mixture in order to facilitate stirring for an additional 3/4 of an hour. The mixture had a pH of 6.98 at 28.5° C. before being filtered. The filtered alumina was washed with aqueous solutions of ammonium hydroxide for 10 times and then the final wash was made with water alone. The washing was done to eliminate substantially all of the chloride ions. The washed alumina was slurried for 1/2 hour in 3 liters of water and upon analysis it showed 13.10% alumina and 0.05% chloride ions. The alumina was peptized by the addition of 63.9 cc. of glacial acetic acid diluted to 127.8 cc. with water. The peptized slurry had a pH of 4.5.

A solution of 18.05 grams of mercuric acetate in 100 cc. of water and 3 cc. of glacial acetic acid was added to half of the above peptized alumina slurry. The mixture was stirred for a 15 minute period and it showed a pH of 4.16 at 24° C. A platinum sulfide slurry was prepared by saturating 400 cc. of a solution containing 8 grams of chloroplatinic acid hexahydrate with hydrogen sulfide for 1/2 hour. The platinum sulfide slurry was added to the alumina slurry and then the resultant mixture was stirred for a 1/2 hour period. The activated solution was dried for 65 hours at 240° F. The dried catalyst was ground to a powder and then calcined for a period of 3 hours at 1000° F. Following the calcination, the catalyst was pelleted into 3/16 inch pills and then calcined for an additional 3 hours at 1000° F. The catalyst contained approximately 0.46% platinum and 0.71% chloride ions and the remainder alumina. The catalyst contained no mercury in the final state.

CATALYST III 5682 grams of aluminum chloride, $AlCl_3 \cdot 6H_2O$, were dissolved in 20 liters of distilled water. To this solution were added 4400 cc. of concentrated ammonium hydroxide. An alumina gel was thus produced and after 1½ hours of stirring, it had a pH of 7.11 at 25° C. The alumina gel was then filtered before being subjected to a washing operation. The alumina gel was washed for 6 consecutive times with 16 liters of water and 160 cc. of concentrated ammonium hydroxide. Each time it was stirred for 3/4 of an hour and then filtered. For the 7th wash, the same washing solution was used except that the material was stirred for 1/2 hour instead of 3/4 of an hour. For the next 3 successive washes, the wash solution contained 16 liters of water and 80 cc. of ammonium hydroxide for each wash. The solution was stirred for 3/4 of an hour before filtering. In the 11th wash, the solution consisted of 16 liters of water and 40 cc. of ammonium hydroxide. The material was stirred for 1/2 hour before filtering. The 12th and final wash was effected by using 16 liters of distilled water and no ammonium hydroxide. The material was agitated for a 1/2 hour period and the pH was found to be 9.96 at 23° C. After filtering, it was noted that as a result of the washing procedure the alumina had changed from a gel to the precipitated form. The filtered alumina was then slurried in 3 liters of water. An analysis showed 13.77% alumina for a slurry weighing 7854 grams and containing approximately 1081 grams of alumina. One-half of the alumina was peptized with 30.4 cc. of glacial acetic acid diluted to a volume of 60.8 cc. with water. The peptized alumina was stirred for 25 minutes and it had a pH of 4.16 at 23° C. A solution of mercuric acetate was prepared by dissolving 17.16 grams of mercuric acetate in 100 cc. of distilled water and 3 cc. of glacial acetic acid which was added to the alumina slurry and then the mixture was stirred for 25 minutes. The pH of the mixture was 3.87 at 23° C.

The platinous tetrammine chloride was prepared by dissolving 4.09 grams of platinous chloride in 400 cc. of ammonium hydroxide by stirring and gentle heating. The final solution was diluted with water to a total volume of 400 cc. After adding 50 cc. of platinous tetrammine chloride solution to the alumina slurry, the remaining 350 cc. of the ammine solution was acidified with 31 cc. of glacial acetic acid to bring the pH to 6 before adding same to the alumina slurry. The total mixture had a pH of 5.32 at 26° C. It was then dried for 69 hours at 240° F. The dried catalyst was then ground to a powdered form before calcining at 1000° F. for a 6 hour period. Thereafter the catalyst was pelleted into 3/16 inch pills. The finished catalyst analyzed 0.48% platinum and 0.33% chloride ions with no mercury present in the remainder of alumina.

The feed stock employed in the evaluation of this invention is given in Table I below.

*Table 1*

| | |
|---|---|
| Feed designation | A |
| °API gravity | 51.3 |
| Reid vapor pressure, p.s.i. | 0.58 |
| ASTM distillation: | |
| I.B.P., ° F. | 236 |
| 5% | 267 |
| 10% | 275 |
| 20% | 291 |
| 30% | 303 |
| 40% | 315 |
| 50% | 326 |
| 60% | 338 |
| 70% | 349 |
| 80% | 364 |
| 90% | 385 |
| 95% | 404 |
| E. P. | 426 |
| Aniline point, ° F. | 140 |
| Octane No., CFRR, clear | 27.6 |
| Aromatics, vol. percent | 9.0 |
| Olefins, mol. percent | 1.0 |
| Sulfur, weight percent | 0.05 |
| Watson factor | 11.89 |
| Molecular weight | 134 |

The above feed stock was hydroformed with the various catalysts described above, and the results obtained are given in Table II below.

*Table II*

| Run No. | 1 | 2 | 3 |
|---|---|---|---|
| Catalyst | III | II | I |
| Feed | A | A | A |
| Temperature, °F | 900 | 900 | 900 |
| Pressure, p.s.i.g. | 250 | 250 | 250 |
| Space Vel., W$_o$/hr./W$_c$ | 1.0 | 1.0 | 1.0 |
| H$_2$ rate, s.c.f.b. | 5,000 | 5,000 | 5,000 |
| Catalyst charge, cc. | 550 | 550 | 550 |
| Reaction Period, Hrs. | 8 | 8 | 8 |
| 100% C$_4$ Liquid, Vol. Percent | 90.3 | 84.6 | 86.8 |
| C$_5$+ Liquid, Vol. Percent | 83.3 | 70.8 | 79.6 |
| 10# RVP Liquid, Vol. Percent | 91.9 | 76.5 | 87.8 |
| Butanes, Vol. Percent | 7.0 | 13.8 | 7.2 |
| Dry Gas, Wt. Percent | 7.6 | 13.2 | 9.3 |
| Octane No. CFRR clear C$_5$+ Gasoline | 89.6 | 99.7 | 88.5 |
| Yield of C$_5$+ Liquid of 85 CFRR clear O. N. | 86.2 | 84.7 | 82.5 |

From Table II above, it can be seen that the run made with Catalyst I, in which a platinum ammine complex without the activating agent resulted in a lower yield of liquid product or selectivity than the run made with platinum sulfide and an activating agent. However, when an ammine complex was used with an activating agent in the preparation of the catalyst, this material produced more liquid product or better selectivity than either of the other runs made. Hence, this indicates that the ammine complex with the activating agent cooperated in producing a hydroforming catalyst of high selectivity.

Having thus provided an explanation of our invention with specific illustrations, it should be understood that no undue limitations or restrictions are to be imposed by reason thereof, but that the present invention is defined by the appended claims.

We claim:

1. A hydrocarbon conversion process which comprises contacting a hydrocarbon reactant at a temperature between about 400° F. and about 1250° F., a pressure from about atmospheric pressure to 2500 pounds per square inch gage and a weight space velocity of about 0.01 to about 15, with a catalyst prepared by the method which comprises combining an ammine complex of a metal selected from the group consisting of platinum and palladium, an activating agent selected from the group consisting of mercury and volatilizable compounds thereof, and a carrier material, said activating agent being used in an amount from about 0.01 to about 10 percent by weight based on the carrier material, and treating the resultant mixture to decompose the ammine complex to a metallic residue on the carrier material.

2. A hydrocarbon conversion process which comprises contacting a hydrocarbon reactant at a temperature between about 800° F. and about 1100° F., a pressure from about atmospheric pressure to 2500 pounds per square inch gage and a weight space velocity of from about 0.1 to about 10, with a catalyst prepared by the method which comprises combining a platinous ammine halide, an alumina carrier and from about 0.01 to about 10 percent by weight based on the alumina carrier of a volatilizable mercury salt of a fatty acid, and treating the resultant mixture to decompose the ammine halide to a metallic residue on the carrier material.

3. The process of claim 2 wherein the water soluble platinous ammine halide is platinous tetrammine chloride.

4. The process of claim 2 wherein the mercury salt of a fatty acid is mercuric acetate.

5. A reforming process which comprises contacting a light hydrocarbon oil at a temperature between about 750° F. and about 1050° F., a pressure between about 25 and about 1000 pounds per square inch gage and a weight space velocity of about 0.05 and 10.0, with a catalyst prepared by the method which comprises combining an ammine complex of a metal selected from the group consisting of platinum and palladium, a carrier material and from about 0.01 to about 10 percent by weight based on the carrier material of an activating agent selected from the group consisting of mercury and volatilizable compounds thereof, and treating the resultant mixture to decompose the ammine complex to a metallic residue on the carrier material.

6. The process of claim 5 wherein the activating agent is a mercury salt of a fatty acid.

7. The process of claim 5 wherein the ammine complex is a water soluble platinous ammine complex.

8. A reforming process which comprises contacting a light hydrocarbon oil at a temperature between about 750° F. and about 1050° F., a pressure between about 25 and about 1000 pounds per square inch gage and a weight space velocity of about 0.05 and 10, with a catalyst prepared by the method which comprises combining a water soluble platinous ammine complex, an alumina material and from about 0.01 to about 10 percent by weight based on the alumina material of a volatilizable mercury salt, and treating the resultant mixture to decompose the ammine complex to a metallic residue on the alumina.

9. The process of claim 8 wherein the mercury salt is a mercury salt of a fatty acid.

10. The process of claim 8 wherein the ammine complex is a water soluble platinous ammine halide.

11. A reforming process which comprises contacting a light hydrocarbon oil at a temperature between about 850° F. and about 975° F., a pressure between about 100 and about 750 pounds per square inch, and a weight space velocity between about 0.25 and about 5.0, with a catalyst prepared by the method which comprises combining a water soluble platinous ammine halide, an alumina material and from about 0.5 to about 5 percent by weight based on the alumina material of a volatilizable mercury salt of a fatty acid, and treating the resultant mixture to decompose the ammine halide to a metallic residue on the alumina material.

12. A reforming process which comprises contacting a naphtha fraction at a temperature of about 750° to about 1050° F., a total pressure of about 25 to about 1000 p.s.i.g., a weight space velocity of about .05 to about 10, in the presence of added hydrogen in an amount of about 0.5 to about 20 mols of hydrogen per mol of naphtha with a catalyst prepared by the method which comprises combining a water soluble platinous ammine halide, an alumina material and from about 0.01 to about 10 percent by weight based on the alumina material of a volatilizable mercury salt of a fatty acid, and treating the resultant mixture to decompose the ammine halide to a metallic residue on the alumina.

13. A reforming process which comprises contacting a naphtha fraction at a temperature of about 850° to about 975° F., a pressure of about 100 to about 750 p.s.i.g., a weight space velocity of about 0.25 to about 5.0, in the presence of added hydrogen in an amount of about 0.5 to about 20 mols of hydrogen per mol of naphtha with a catalyst prepared by the method which comprises combining platinous tetrammine chloride, an alumina material and from about 0.5 to about 5 percent by weight based on the alumina material of mercuric acetate, and treating the resultant mixture to decompose the chloride to a metallic residue on the alumina.

14. A reforming process which comprises contacting a naphtha fraction at a temperature of about 750° to about 1050° F., a total pressure of about 25 to about 1000 p.s.i.g., a weight space velocity of about .05 to about 10, in the presence of added hydrogen in an amount of about 0.5 to about 20 mols of hydrogen per mol of naphtha with a catalyst prepared by the method which comprises combining platinous tetrammine chloride, an alumina material and from about 0.5 to about 5 percent by weight of mercuric acetate, and treating the resultant mixture to decompose the tetrammine chloride to a metallic residue on the alumina.

15. A reforming process which comprises contacting a naphtha fraction at a temperature of about 750° to about 1050° F., a total pressure of about 25 to about 1000 p.s.i.g., a weight space velocity of about .05 to about 10, in the presence of added hydrogen in an amount of about 0.5 to about 20 mols of hydrogen per mol of naphtha with a catalyst prepared by the method which comprises combining platinous tetrammine chloride, an alumina material and from about 0.01 to about 10% by weight based on the alumina material of mercuric acetate, and treating the resultant mixture to decompose the tetrammine chloride to a metallic residue on the alumina.

References Cited in the file of this patent

UNITED STATES PATENTS

| | | |
|---|---|---|
| 2,602,772 | Haensel | July 8, 1952 |
| 2,611,736 | Haensel | Sept. 23, 1952 |
| 2,623,860 | Haensel | Dec. 30, 1952 |
| 2,635,080 | Appell | Apr. 14, 1953 |
| 2,659,701 | Heard et al. | Nov. 17, 1953 |
| 2,662,861 | Riblett et al. | Dec. 15, 1953 |
| 2,743,215 | Riblett et al. | Apr. 24, 1956 |

UNITED STATES PATENT OFFICE
CERTIFICATE OF CORRECTION

Patent No. 2,888,397

May 26, 1959

William P. Burton et al.

It is hereby certified that error appears in the printed specification of the above numbered patent requiring correction and that the said Letters Patent should read as corrected below.

Column 3, line 53, for "bismethylaminodiamineplatinous" read -- bismethylaminodiammineplatinous --; column 4, line 30, for "cids" read -- acids --; line 66, for "0.05" read -- 0.5 --; column 5, line 4, for "he" read -- the --.

Signed and sealed this 13th day of October 1959.

(SEAL)

Attest:

KARL H. AXLINE
Attesting Officer

ROBERT C. WATSON
Commissioner of Patents